United States Patent
Collins et al.

(10) Patent No.: US 8,850,000 B2
(45) Date of Patent: Sep. 30, 2014

(54) TRIGGER-BASED DATA COLLECTION SYSTEM

(75) Inventors: Paul Francis Collins, Alsip, IL (US); Michael Shawn Martin, Aurora, IL (US)

(73) Assignee: Electro-Motive Diesel, Inc., LaGrange, IL (US)

(*) Notice: Subject to any disclaimer, the term of this patent is extended or adjusted under 35 U.S.C. 154(b) by 100 days.

(21) Appl. No.: 13/466,592

(22) Filed: May 8, 2012

(65) Prior Publication Data

US 2013/0304896 A1    Nov. 14, 2013

(51) Int. Cl.
*G06F 15/173*    (2006.01)

(52) U.S. Cl.
USPC .......................................................... 709/224

(58) Field of Classification Search
CPC ................................ H04L 41/06; H04L 43/00
USPC ................................................ 709/223–224
See application file for complete search history.

(56) References Cited

U.S. PATENT DOCUMENTS

| | | | |
|---|---|---|---|
| 5,570,284 A | 10/1996 | Roselli et al. | |
| 5,719,771 A | 2/1998 | Buck et al. | |
| 6,487,478 B1* | 11/2002 | Azzaro et al. | 701/24 |
| 6,778,893 B2* | 8/2004 | Murakami et al. | 701/50 |
| 6,993,675 B2* | 1/2006 | Roddy et al. | 714/2 |
| 7,043,566 B1* | 5/2006 | Grant et al. | 719/323 |
| 7,330,117 B2 | 2/2008 | Ferguson et al. | |
| 7,467,032 B2 | 12/2008 | Kane et al. | |
| 2007/0120736 A1 | 5/2007 | MacKenzie et al. | |
| 2007/0179747 A1* | 8/2007 | Nelson et al. | 702/185 |
| 2008/0051955 A1 | 2/2008 | Ross et al. | |
| 2009/0106571 A1* | 4/2009 | Low et al. | 713/310 |
| 2011/0077816 A1 | 3/2011 | Biondo et al. | |
| 2013/0304896 A1* | 11/2013 | Collins et al. | 709/224 |

* cited by examiner

*Primary Examiner* — Lance L Barry
(74) *Attorney, Agent, or Firm* — Finnegan, Henderson, Farabow, Garrett & Dunner LLP

(57) ABSTRACT

A system for collecting and communicating data associated with at least one of a plurality of machines includes a sensor. The sensor is configured to monitor an operational condition of the at least one associated machine and provide signals indicative of the operational condition. The system includes at least one local data system, including a processor, associated with the machine and configured to receive signals from the sensor, detect an event affecting the at least one machine based on the signals received from the sensor, and communicate data relevant to the detected event to a location remote from the at least one machine. A central data system including a processor and configured to receive the data relevant to the detected event and communicate with other machines of the plurality of much such that the other machines communicate data relevant to the detected event to the central data system is included.

12 Claims, 3 Drawing Sheets

TRIGGER-BASED DATA COLLECTION SYSTEM

TECHNICAL FIELD

This disclosure relates generally to systems and methods monitoring operation and fault conditions of a machine, and more specifically, to systems and methods for collecting and communicating data associated with a fleet of machines in response to a triggering event.

BACKGROUND

Machine downtime suffered as a result of a fault condition in a machine such as, for example, a locomotive, can be costly, so efficient diagnostics systems are desirable to minimize repair time. In complex machines with multiple subsystems, it may be difficult to determine which subsystem is suffering from a fault or the particular cause of that fault without extensive analysis of the affected machine.

For maintenance and diagnostic purposes, it may be desirable to collect data relating to a machine during real-time operation for later retrieval. In some diagnostic systems, the data collected often includes much more information than what may be desired for a specific purpose or application. However, the data collected may be useful for maintenance of a fleet of machines, in addition to the particular machine from which the data is collected.

One solution for monitoring a locomotive is described in U.S. Pat. No. 6,487,478 B1 ("the '478 patent"). The '478 patent is directed to an on-board monitor for a railroad locomotive that interfaces with the controller subsystems of the locomotive to collect parametric performance data. The specific data to be collected and the collection intervals are defined at a remote service center and transmitted to the on-board monitor. The on-board monitor also includes the capability to collect additional data or collect data more frequently in response to the results of certain triggering events.

Although the system and method disclosed in the '478 patent may monitor and report operational data of a machine, the system and method disclosed may still suffer from a number of possible drawbacks. For example, the system and method disclosed in the '478 patent only collects information from the particular locomotive that suffered the fault. When machines in a fleet have similar operating conditions, collecting data from multiple machines may lead to faster and more accurate fault identification. Furthermore, data collection from a fleet of machines may result in more quickly recognizing a common problem about the machines, such that similar faults can be prevented in the remainder of the machines in the fleet. Additionally, the system and method disclosed in the '478 patent, in response to a fault trigger or a request from another system, transmits all the data collected from its machine. In complex machines such as locomotives, this may result in transmission of a significantly large amount of data, a large portion of which may be wholly unrelated to the fault condition that triggered the data collection or transmission. When a particular event triggers a fault condition, it may be preferable to send only relevant data to decrease the time and cost of data analysis.

The presently disclosed systems and methods may be directed to mitigating or overcoming one or more of the possible drawbacks set forth above and/or other problems in the art.

SUMMARY

According to one aspect, the present disclosure is directed to a system for collecting and communicating data associated with at least one of a plurality of machines and may include at least one sensor associated with at least one of the plurality of machines. The at least one sensor may be configured to monitor an operational condition of the at least one machine and provide signals indicative of the operational condition. The system may also include at least one local data system associated with the at least one machine. The at least one local data system may include a processor and may be configured to receive signals from the at least one sensor and detect an event affecting the at least one machine based on the signals received from the at least one sensor. The at least one local data system may also be configured to communicate data relevant to the detected event to a location remote from the at least one machine. The system may also include a central data system. The central data system may include a processor and be configured to receive the data relevant to the detected event and communicate with other machines of the plurality such that the other machines communicate data relevant to the detected event to the central data system.

In accordance with another aspect, the present disclosure is directed to a processor-implemented method for collecting data from at least one machine. The method may include detecting via a first processor an event associated with an affected machine of the at least one machines and determining a relevant data portion of machine data based on the event. The method may also include commanding the affected machine to collect event-specific data and receiving via a second processor the event-specific data and the relevant data portion from the affected machine.

According to another aspect, the present disclosure is directed to a machine fleet. The machine fleet may include a plurality of machines and a data collection system. The data collection system may include at least one sensor associated with at least one of the plurality of machines. The at least one sensor may be configured to monitor an operational condition of the at least one machine and provide signals indicative of the operational condition. The data collection system may also include at least one local data system associated with the at least one machine. The at least one local data system may include a processor and may be configured to receive signals from the at least one sensor and detect an event affecting the at least one machine based on the signals received from the at least one sensor. The at least one local data system may also be configured to communicate data relevant to the detected event to a location remote from the at least one machine. The data collection system may also include a central data system. The central data system may include a processor and be configured to receive the data relevant to the detected event and communicate with other machines of the plurality such that the other machines communicate data relevant to the detected event to the central data system.

DETAILED DESCRIPTION

Figure 1:
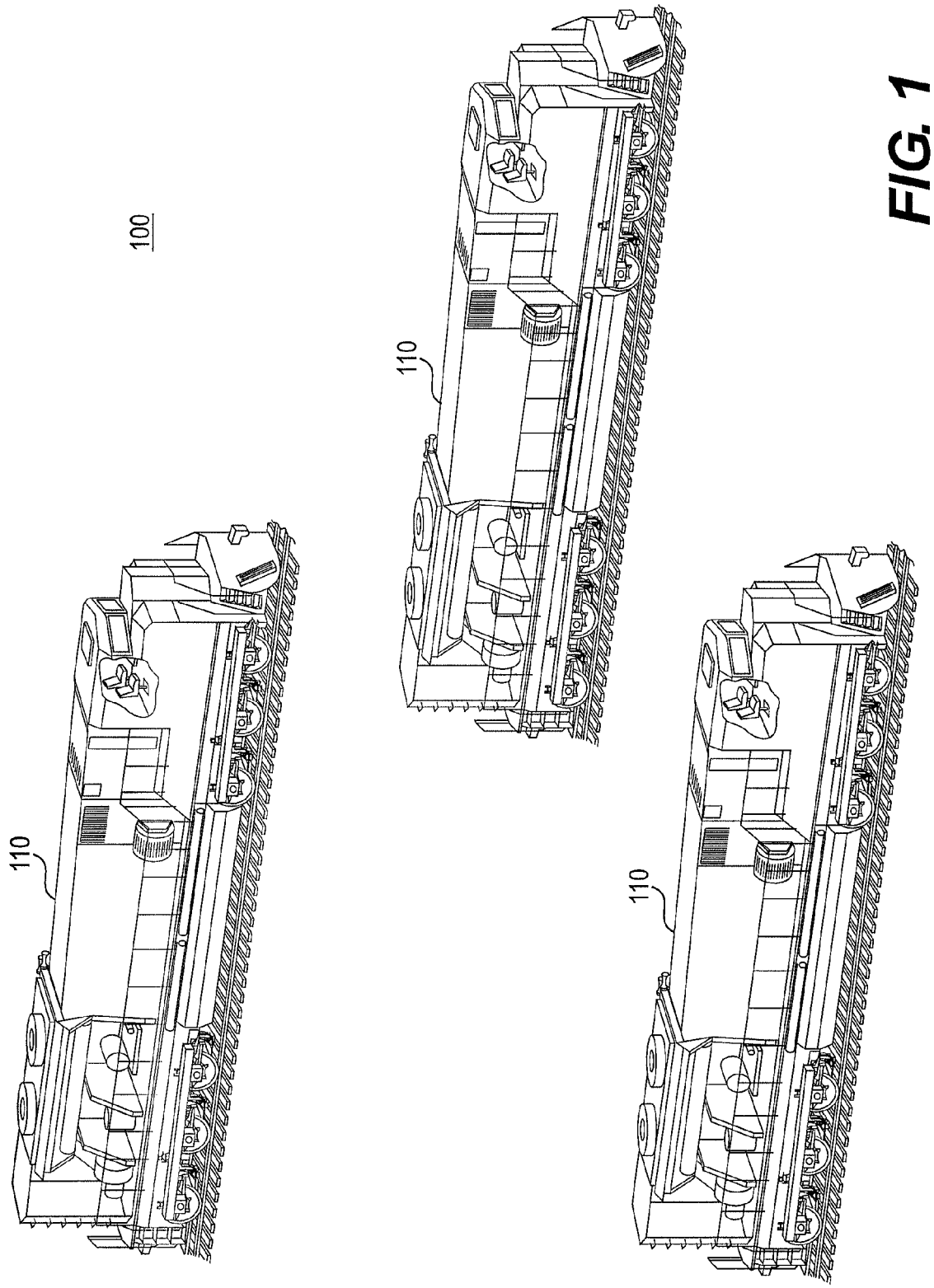
FIG. 1 is a schematic depiction of an exemplary machine fleet.

FIG. 1 shows an exemplary machine fleet 100 in which systems and methods for data collection may be implemented consistent with the disclosed embodiments. Machine fleet 100 may include any group of machines 110 defined by shared or similar characteristics. According to some embodiments, each machine 110 of machine fleet 100 may be the same type or the same model of machine. For example, the three machines 110 comprising the exemplary machine fleet 100 shown in FIG. 1 are all locomotives. Machine fleet 100 may include other types of machines, including but not limited to fixed engine systems, construction machines, commercial machines, and marine-based machines, that may incorporate the systems and methods for data collection consistent with the embodiments disclosed herein.

A machine fleet 100 may be defined by shared or similar characteristics among the plurality of machines 110 of machine fleet 100. It may be desirable to define machine fleet 100 based on a common characteristic that makes machines 110 of machine fleet 100 particularly likely to experience common faults or malfunctions. For example, machines 110 that all work in similar environmental conditions, such as, for example, extremely hot temperatures or windy, dusty climates, are likely to experience similar operating conditions and suffer from faults related to those conditions. Therefore, it may be desirable to collect operational data from similar machines 110 or machines 110 operating in similar conditions to identify the cause of possible machine faults, thereby reducing downtime and providing data helpful to preventing similar faults among other machines 110 in a particular machine fleet 100.

According to some embodiments, machines 110 of a particular machine fleet 100 may also be defined by other common characteristics. For example, machine fleet 100 may be a locomotive consist in which each machine 110 is a locomotive, and all machines 110 are connected together to form a train. According to some embodiments, machines 110 may be grouped in a particular machine fleet 100 by a similar type of load each machine 110 carries. For example, machine fleet 100 may include a plurality of locomotives each pulling passenger cars. According to some embodiments, machine fleet 100 may be defined by a common geographic location of each machine 110. For example, machines 110 of a particular machine fleet 100 may all be operating at a single worksite. Alternatively or additionally, machines 110 of a particular machine fleet 100 may all be operating in a certain geographic area, such as within a predefined radius of an identified location, or within a certain geographic region.

According to some embodiments, machines 110 of a particular machine fleet 100 may share similar working conditions. For example, machines 110 of a particular machine fleet 100 may all work at construction sites that present similar problems, such as, for example, rocky soil. Alternatively or additionally, machines 110 of a particular machine fleet 100 may all have similar purposes. For example, machines 110 of a particular machine fleet 100 may be of different types yet all be used to move heavy loads. It will be apparent that it may be beneficial to categorize machines 110 in a particular machine fleet 100 by one or more characteristics, including but not limited to those discussed above, in order to streamline troubleshooting and share useful operating information among machines 110 of the particular machine fleet 100.

Figure 2:
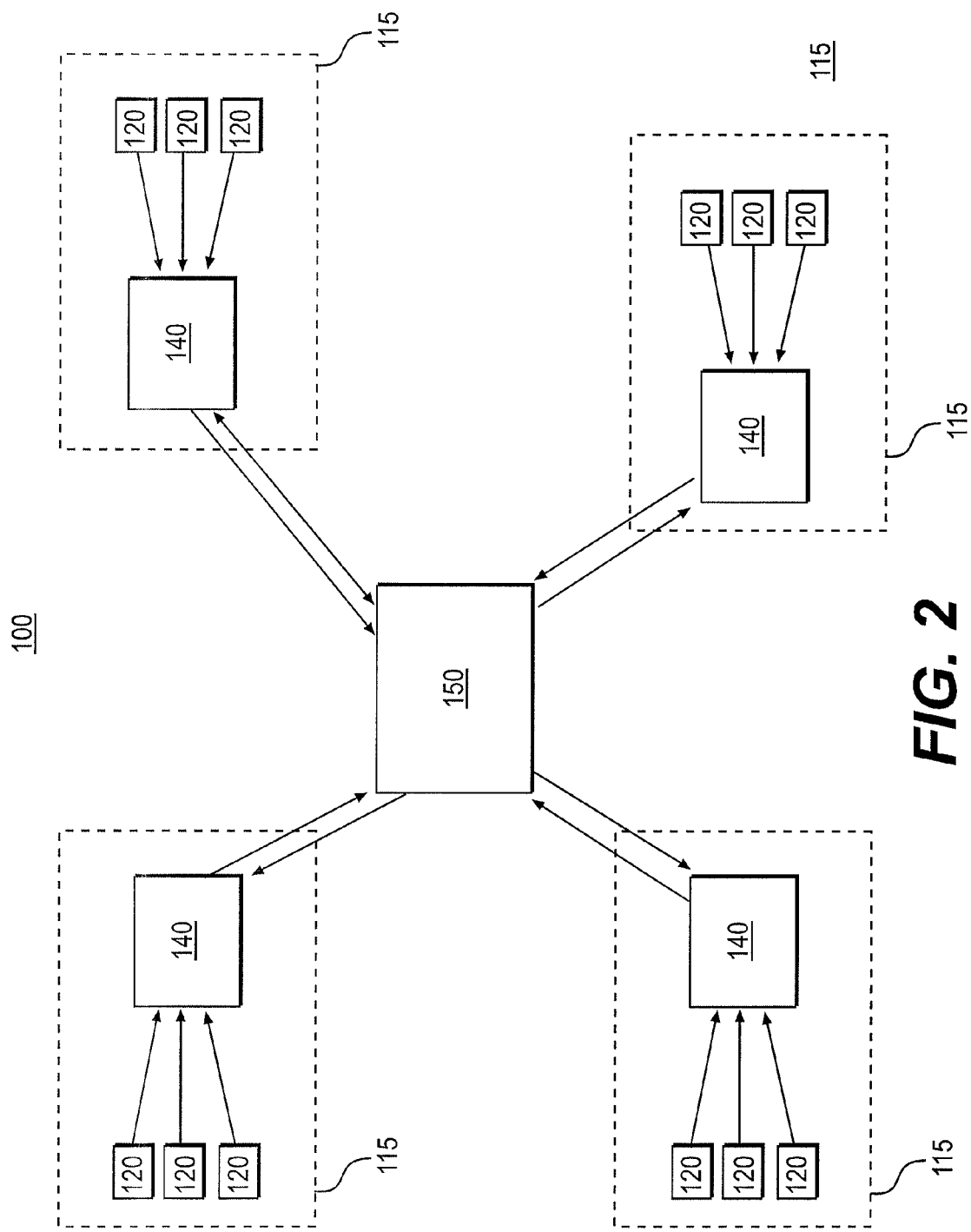
FIG. 2 is a block diagram of an exemplary data collection system.

Machine fleet 100 may also include a data collection system 115, as illustrated in FIG. 2. Data collection system 115 may gather specific machine data from a larger pool of data being collected in response to a triggering event or condition. For example, a triggering event may include the fault of a subsystem of one or more of machines 110. Alternatively, the event may include the fault of machine 110. Alternatively or additionally, the triggering event may include a temperature rising above a threshold limit in one or more of machines 110. The triggering event may be based on a sensor reading of one or more sensors associated with machines 110. According to some embodiments, the triggering event may be a communication from a machine operator of a fault condition or breakdown. For example, an operator of machine 110 may send a signal to data collection system 115 indicative of a fault.

Machine data that data collection system 115 may collect includes two types of information. Machines 110 may continuously collect data from various subsystems and sensors within machine. To analyze machine 110 in response to a triggering event, it may not be necessary for data collection system 115 to provide this large amount of data from the affected machine 110 or other machines 110 in fleet 100. Instead, data collection system 115 may identify which portions of the total data is relevant. This first data set, which may include historical data that predates the occurrence of the triggering event, is "relevant data." Data collection system 115 may want additional data collected in response to a triggering event. For example, data collection system 115 may want data collected for a period of time after the occurrence of the event. This type of data, measured in response to a triggering event, is "event-specific data."

Data collection system 115 may include a plurality of sensors 120. Each sensor 120 may be configured to monitor a particular operational condition of a machine 110. For example, each machine 110 may include one or more sensors 120 configured to monitor the temperature at various locations of associated machine 110. Additionally or alternatively, machine 110 may include sensors 120 to monitor the functionality of one or more subsystems of machine 110. For example, sensors 120 may monitor electric characteristics, such as current flow and/or voltage potential to determine whether an electronic subsystem is functioning normally. Sensors 120 may monitor any machine condition that is directly or indirectly indicative of the operability of machine 110 or its subsystems, including, but not limited to, pressure, density, emissions data, speed, fluid level, fluid flow, volume flow rate, vibration, torque, force, throttle position, mass air-fuel ratio, traction, rotary position, rotational motion, and speed. Data collection system 115 may include any combination of sensors 120 known in the art.

Data collection system 115 may include at least one local data system 140, each local data system 140 being associated with one of machines 110. Local data system 140 may embody a single microprocessor or multiple microprocessors that include a means for receiving machine data from sensors 120 and/or other local data systems 140 and for communicating with other systems. Numerous commercially available microprocessors can be configured to perform the functions of local data system 140. It should be appreciated that local data system 140 could readily embody a general machine or engine microprocessor capable of gathering machine data. Local data system 140 may include all the components required to run an application such as, for example, a memory, a secondary storage device, and a processor, such as a central processing unit or any other means known. Various other known circuits may be associated with local data system 140, including power source circuitry (not shown) and other appropriate circuitry.

In FIG. 2, each machine 110 in fleet 100 includes at least one local data system 140, and local data system 140 may be associated with (e.g., located within) machine 110. Local data system 140 may be configured to receive machine data from the associated machine 110. For example, local data system 140 may receive machine data from one or more of sensors 120 associated with the same machine 110. Machine data may include any information related to the operation or the condition of machine 110, including machine conditions measured and/or reported by sensors 120.

According to some embodiments, local data system 140 may continually overwrite machine data received from sensors 120 with new machine data. Some embodiments of local data system 140 may be configured to store the most recent machine data, such as, for example, data from a predefined period of time such as the last thirty seconds of operation. By overwriting outdated data to store recent machine data, the memory of local data system 140 can be smaller, as it will only store a predefined maximum amount of data from each sensor 120.

In some embodiments, local data system 140 may be configured to stop storing and/or overwriting data from sensors 120 in response to a triggering event. This prevents overwriting data that may be useful in diagnosing the cause of the triggering events. According to some embodiments, local data system 140 may collect event-specific data in response to a triggering event. For example, once local data system 140 detects a triggering event, local data system 140 may be configured to continue to collect data from sensors 120 for a predefined period of time, such as for ten seconds after the triggering event is detected. Data collected after the triggering event that is detected may be called "event-specific data." According to some embodiments, event-specific data may be collected at a faster rate than sensors 120 collect data prior to identifying a triggering condition. For example, sensors 120 may collect event-specific data at 5 millisecond intervals.

Local data system 140 may be capable of detecting an event affecting machine 110 based on machine data that local data system 140 receives related to its associated machine 110. Once the occurrence of an event is detected, local data system 140 may determine which portions of the collected machine data are relevant data based on the event. For example, the relevant data portion may depend upon the nature of the event. According to some embodiments, if the triggering event is an overheating condition, the relevant data portion may include temperature data that local data system 140 has received from one or more of sensors 120. Alternatively or additionally, the relevant data portion may depend on the timing of the triggering event. For example, if the event occurs within a predefined time of machine startup, the relevant data portion may include data related to the start up, including data related to subsystems that had been operating at the time of the triggering event and data related to the operability of those subsystems. Local data system 140 may identify the relevant data by the sensor 120 from which the data originates.

Data collection system 115 may also include a central data system 150. Central data system 150 may be associated with (e.g., located on) one of the plurality of machines 110. Alternatively, central data system 150 may be located remotely with respect to machines 110. Central data system 150 may embody a single microprocessor or multiple microprocessors that include a means for receiving relevant data from and/or for sending instructions to local data systems 140. Central data system 150 may be configured to receive machine data from at least one of the plurality of local data systems 140. Central data system 150 may also be configured to analyze and/or process the machine data to determine the cause of or solution to the triggering event. Numerous commercially available microprocessors can be configured to perform the functions of central data system 150. It should be appreciated that central data system 150 could readily embody a general machine or engine microprocessor capable of gathering machine data. Central data system 150 may include all the components required to run an application such as, for example, a memory, a secondary storage device, and a processor, such as a central processing unit or any other means known. Various other known circuits may be associated with central data system 150, including power source circuitry (not shown) and other appropriate circuitry.

Central data system 150 may be configured to receive the relevant data portion from at least one of the plurality of local data systems 140. Once central data system 150 has received the relevant data portion, this data may be analyzed and/or processed (e.g., by central data system 150) to determine the cause or solution of the triggering event. According to some embodiments, central data system 150 may receive the relevant data portion from all machines 110 in fleet 100 at the same time. Alternatively, central data system 150 may receive the relevant data portion from the affected machine 110 and then request the relevant data portion from other machines 110. The order of data receipt may be configured by the user according to the particular application.

Local data system 140 may be configured to transmit the relevant data portion and the event-specific data to central data system 150. According to some embodiments, local data system 140 may transmit event-specific data to central data system 150 automatically. Alternatively, local data system 140 may transmit the event-specific data to central data system 150 in response to a request from central data system 150. In a similar manner, local data system 140 may transmit the relevant data portion to central data system 150 based on the triggering event. Alternatively, central data system 150 may identify the relevant data portion and communicate this to local data system 140. For example, central data system 150 may identify the relevant data portion by the sensor(s) 120 from which the data originated.

For example, central data system 150 may be further configured to receive a first signal from one or more of local data systems 140 indicative of the nature of the event. In response, central data system 150 may send a second signal to local data system 140 identifying the event-specific data and requesting local data system 140 to begin collecting the event-specific data to transmit to central data system 150. The second signal may also identify the relevant data portion, such that local data system 140 is able to identify and collect the relevant data portion for central data system 150.

Central data system 150 may share information among different machines 110. For example, central data system 150 may be configured to identify a plurality of machines 110 that share one or more characteristics with other machines 110. According to some embodiments, the plurality of machines 110 sharing one or more characteristics may make up a portion or all of machine fleet 100. In response to a triggering event in one machine 110 of a particular machine fleet 100, central data system 150 may be configured to communicate the identity of the relevant data portion to other local data systems 140 in machine fleet 100. Central data system 150 may receive the relevant data portion from each of the local data systems 140 in machine fleet 100.

According to some embodiments, when a triggering event occurs on one machine 110, local data system 140 not associated with that machine may be configured to collect event-specific data. For example, central data system 150 may be configured to send a signal to all local data systems 140 in a particular machine fleet 100 indicative of the occurrence of an event on at least one machine 110 of machine fleet 100. Likewise, central data system 150 may request event-specific data from all machines 110 in response to an event associated with one machine 110.

According to some embodiments, once local data system 140 has determined that a second event has occurred, it may be configured to collect event-specific data and transmit this data to central data system 150. Central data system 150 may be configured to receive the event-specific data and the relevant data portion from each machine 110 in machine fleet 100. Central data system 150 may analyze event-specific data from all machines 110 in machine fleet 100 to determine any anomalies particular to machine 110 on which the event occurred to narrow down the cause of or solution to the event.

Figure 3:
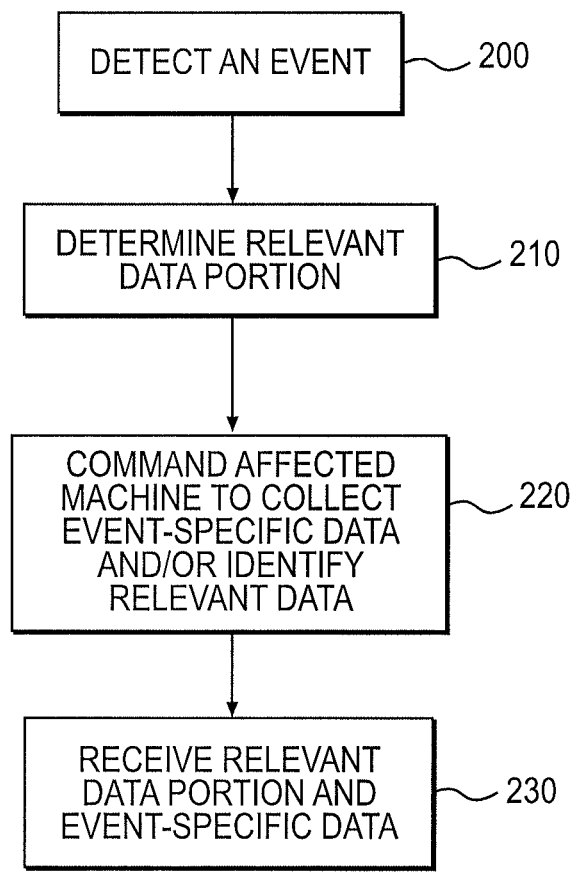
FIG. 3 is a flowchart of an exemplary method of collecting data from at least one machine.

FIG. 3 is a flowchart of an exemplary method for collecting data from at least one machine 110. For example, at step 200, the method may include detecting an event associated with an affected machine 110 of the at least one machine 110. Once the event has been detected, step 210 may include determining a relevant data portion of machine data based on the event. According to some embodiments, local data system 140 may determine the relevant data portion. Alternatively or additionally, central data system 150 may send a first signal to local data system 140 of the affected machine identifying the relevant data portion. Central data system 150 may also send the first signal to other machines 110 identified as having a common characteristic with the affected machine 110.

According to some embodiments, central data system 150 may command affected machine 110 to collect event-specific data at step 220. According to some embodiments, central data system 150 may communicate this command to the local data system 140 associated with the affected machine 110. Central data system 150 may also request event-specific data from other machines 110 identified as having a common characteristic with the affected machine 110. At step 230, central data system 150 may receive the event-specific data and the relevant data portion. Optionally, central data system 150 may receive similar data from other machines 110 in machine fleet 100.

INDUSTRIAL APPLICABILITY

The disclosed systems and methods may provide a robust solution for maintenance and diagnostics of a fleet of machines. As a result of event-based data collection, the disclosed systems and methods may provide a more refined solution to data collection, decreasing the amount of unnecessary data transmission.

The presently disclosed systems and methods may have several advantages. For example, the disclosed data collection methods may more accurately diagnose a problem by collecting data related to the particular event. This solution may allow for customized data collection in response to a particular fault or triggering event, which helps collect more data that is likely to provide the key to correcting the identified fault.

Furthermore, the disclosed systems and methods may provide a more efficient solution for data communication, which may be particularly useful when time spent transmitting or processing data may result in additional downtime. For machines that are unable to operate until a fault is corrected, this downtime may be costly and prevent operators from meeting deadlines. While more sensors are incorporated into complex machines to monitor their operation, the key issue may no longer be collecting enough information to identify the problem. Rather, the key to efficient repair of machine fleets may be identifying what portions, if any, of the gathered operational data are useful in solving a particular problem.

Additionally, by gathering relevant data from all machines in the fleet, rather than just those suffering from a fault, the systems and methods may facilitate identifying a cause, rather than just a solution, of particular faults. For example, collecting event-specific and relevant machine data from all machines in a fleet may help an engineer determine which values are particular to the broken machine and which characteristics are within a normal range for that machine. Furthermore, sharing known problems among a fleet can help identify likely problems of a particular machine within the fleet before that machine data is analyzed.

It will be apparent to those skilled in the art that various modifications and variations can be made to the data collection systems and associated methods for operating the same. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A system for collecting and communicating data associated with at least one of a plurality of machines, the system comprising:
    at least one sensor associated with at least one of the plurality of machines, the at least one sensor being configured to monitor an operational condition of the at least one machine and provide signals indicative of the operational condition;
    at least one local data system associated with the at least one machine, the at least one local data system including a processor and being configured to:
    receive signals from the at least one sensor;
    detect an event affecting the at least one machine based on the signals received from the at least one sensor; and
    communicate data relevant to the detected event to a location remote from the at least one machine; and
    a central data system including a processor and configured to receive the data relevant to the detected event, and communicate with other machines of the plurality of machines such that the other machines communicate data relevant to the detected event to the central data system,
    wherein the central data system is further configured to:
        identify a plurality of machines that share a characteristic with the at least one machine;
        communicate the identity of the relevant data to the local data systems associated with the plurality of machines; and
        receive the relevant data from each of the local data systems associated with the plurality of machines.

2. The system of claim 1, wherein the at least one local data system is further configured to:
    collect event-specific data based on the event; and
    transmit the event-specific data to the central data system.

3. The system of claim 2, wherein the central data system is further configured to:
    receive a first signal from the at least one local data system indicative of the event; and
    send a second signal to the at least one local data system identifying the relevant data and the event-specific data and requesting the at least one local data system collect the event-specific data.

4. The system of claim 2, wherein the at least one local data system is further configured to:
    determine whether a second event occurred on a second machine;
    collect event-specific data based on the second event; and
    transmit the event-specific data to the central data system.

5. The system of claim 4, wherein the at least one local data system is further configured to receive an event trigger signal from the central data system indicative of the second event that occurred on the second machine.

6. The system of claim 1, wherein the central data system is further configured to:
   command each of the local data systems associated with the plurality of machines to collect event-specific data; and
   receive the event-specific data and the relevant data from each of the plurality of machines.

7. The system of claim 1, wherein the shared characteristic includes at least one of a machine type, a machine model, a working condition, a geographic location, and an environmental condition.

8. A machine fleet comprising:
   a plurality of machines; and
   a data collection system including:
      at least one sensor associated with at least one of the plurality of machines, the at least one sensor being configured to monitor an operational condition of the at least one machine and provide signals indicative of the operational condition;
      at least one local data system associated with the at least one machine, the at least one local data system including a processor and being configured to:
         receive signals from the at least one sensor;
         detect an event affecting the at least one machine based on the signals received from the at least one sensor; and
         communicate data relevant to the detected event to a location remote from the at least one machine; and
      a central data system including a processor and configured to receive the data relevant to the detected event, and communicate with other machines of the plurality of machines such that the other machines communicate data relevant to the detected event to the central data system,
   wherein the central data system is further configured to:
      identify a subset of the plurality of machines that shares a characteristic with the affected machine;
      communicate an identity of the relevant data to a local data system associated with each machine of the subset; and
      receive relevant data from each of the local data systems associated with the subset.

9. The machine fleet of claim 8, wherein the central data system is further configured to:
   receive a first signal from the at least one local data system indicative of the event; and
   send a second signal to the at least one local data system identifying the relevant data portion and event-specific data to be collected, and requesting the at least one local data system to collect the event-specific data.

10. The machine fleet of claim 8, wherein a plurality of local data systems are associated with the plurality of machines and each of the plurality of local data systems is further configured to:
    collect event-specific data based on the event; and
    transmit the event-specific data to the central data system.

11. The machine fleet of claim 8, wherein the central data system is further configured to:
    command each of the local data systems associated with the subset to collect event-specific data; and
    receive the event-specific data and the relevant data from each local data system of the subset.

12. The machine fleet of claim 8, wherein the shared characteristic includes at least one of a machine type, a consist, a load type, an environmental condition, a machine model, and a geographic location.

* * * * *